(12) United States Patent
Blanchard (10) Patent No.: US 7,641,580 B2
(45) Date of Patent: Jan. 5, 2010

(54) TRANSMISSION

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 390 days.

(21) Appl. No.: 11/583,153

(22) Filed: Oct. 19, 2006

(65) Prior Publication Data

US 2007/0111850 A1 May 17, 2007

(30) Foreign Application Priority Data

Oct. 19, 2005 (FR) .................................. 05 10618

(51) Int. Cl.
*F16H 37/02* (2006.01)
*G05G 9/00* (2006.01)
*F16H 9/00* (2006.01)
*B60K 26/00* (2006.01)

(52) U.S. Cl. .................... 475/209; 74/473.19; 474/1; 180/333

(58) Field of Classification Search ............. 475/209, 475/210; 477/41; 74/473.13, 473.14, 473.19, 74/404, 355; 474/1, 37; 192/3.54; 180/323, 180/325, 333, 336
See application file for complete search history.

(56) References Cited

U.S. PATENT DOCUMENTS 3,083,801 A * 4/1963 Frohner ..................... 192/3.57
3,999,444 A * 12/1976 Willman ........................ 474/1
4,771,856 A 9/1988 Hutchison et al.
5,526,889 A * 6/1996 Neary ........................ 180/6.66
6,478,702 B2 * 11/2002 Borghi et al. ................. 474/37
6,561,935 B2 * 5/2003 Peeters et al. ................. 474/37
2004/0159524 A1* 8/2004 Carpenter et al. .......... 192/91 A

FOREIGN PATENT DOCUMENTS

EP 1 090 802 4/2001
EP 1 160 490 12/2001

* cited by examiner

*Primary Examiner*—Roger Pang
(74) *Attorney, Agent, or Firm*—Young & Thompson

(57) ABSTRACT

The invention relates to a transmission, in particular between a drive shaft and a wheel driving shaft of an engine, in particular of an automotive engine, such as a riding mower engine, whereby this transmission is of the belt-controlled variable-speed drive unit type (2) combined with a clutch device (7).

This transmission is characterized in that it is equipped with at least one progressive-type clutch device (7), preferably friction-based, and comprises a control mechanism (20) that is common to clutch device(s) (7) and to the variable-speed drive unit (2), whereby this control mechanism (20), in a first step, acts on the clutch device (7) to pass from the disengaged position, so-called of zero speed, to the engaged position that corresponds to the minimum operational speed of the variable-speed drive unit (2), then, in a second step, acts on the speed variation mechanism (6) of the variable-speed drive unit (2) to regulate as desired the speed of the engine that is equipped with such a variable-speed drive unit (2).

18 Claims, 6 Drawing Sheets

TRANSMISSION

BACKGROUND OF THE INVENTION

This invention relates to a transmission, in particular between a drive shaft and a wheel driving shaft of an engine, in particular of an automotive engine, such as a riding mower engine, whereby this transmission is at least of the belt-controlled variable-speed drive unit type combined with a clutch device, an engine, in particular an automotive engine, such as a riding mower engine, equipped with such a transmission as well as a process for operational control of such an engine.

Such transmissions are well known to those skilled in this art as, in particular, U.S. Pat. No. 6,755,759 illustrates. These transmissions generally consist of a variable-speed drive unit combined with a reduction clutch mechanism that is housed in a box. The clutch device is generally of the clutch-sleeve type. To date, such transmissions comprise two control elements that are actuated and that operate independently, namely a first control element that allows the passage of the clutch mechanism from the disengaged position to the engaged position, and a second control element that acts on the variable-speed drive unit, generally by controlling the speed variation by drawing together or separating the flanges of one of the pulleys of the variable-speed drive unit.

The problem of such a design is that the belt-controlled variable-speed drive unit can vary the rate of advance of the engine only within a determined range that goes from a minimum speed that is greater than zero to a maximum speed, whereby the minimum speed is based on the design characteristics of the variable-speed drive unit. It is therefore impossible to vary the rate of advance of the engine between zero and the minimum speed of the variable-speed drive unit, whereby this range of speed corresponds to the passage from the disengaged position to the engaged position of the clutch mechanism of the transmission, and whereby this clutch device is generally of the non-progressive type.

There are also transmissions that are applied to light automotive vehicles. Thus, the Patent EP-A-1,160,490 describes a belt-controlled transmission unit with a variable ratio in a continuous manner for vehicles with internal combustion engines, such as mini-vehicles. This unit comprises, housed in a box, a disk and jaw clutch and a belt-controlled variable-speed drive unit that is made up of two pulleys and a belt. A control element that is common to the clutch and to the variable-speed drive unit is provided. The operation of this unit is as follows. When there is no stress, the clutch is engaged, whereby the jaws are held against the disk via a spring. When the control element, which acts, on the one hand, on the spring to create the passage from the disengaged position to the engaged position of the clutch, and acts, on the other hand, on the drawing-together of the flanges of the variable-speed drive unit, is activated, it brings about, in a first step, by releasing the deformation of the spring of the clutch, the passage from the disengaged position to the engaged position of the clutch, then, in a second step, the drawing-together of the flanges in the direction of an increase of the speed. The drawback of such a control device is that it should, in a normally inactive position, apply force on the clutch device to keep the latter in a disengaged position, bringing about premature wear of the unit. Such a solution cannot be transferred to a riding mower engine where, for safety reasons, it is imperative that the transmission be disengaged in the case of failure, for example, of the control mechanism.

Patent EP-A-1,090,802 describes a transmission that comprises a disk clutch and a belt-controlled variable-speed drive unit controlled from a single control element that is made up of a lever that is moved by a cam. The lever acts on two thrust units that can move axially on the shaft that carries the clutch device and the pulley with movable flanges. Thus, in a first step, the lever allows an axial movement of the unit in terms of an engagement of the clutch device, then this lever acts via the thrust unit on the flanges of the pulley. This transmission comprises the same drawbacks as those mentioned in the Patent EP-A-1,160,490 since again, the control device in rest position acts for returning the clutch device into disengaged position.

SUMMARY OF INVENTION

One object of this invention is therefore to propose a transmission and an engine equipped with such a transmission whose designs make it possible, at minimum cost and with little wear, to vary continuously the rate of advance of the engine in forward and/or in reverse between zero and the maximum speed of the engine.

Another object of this invention is to propose a transmission whose control, although simplified, has a sturdy design and does not permanently stress the elements of said transmission so as to avoid any premature wear, this control ensuring, because of its design, the absence of the engine moving in the case of failure.

For this purpose, the invention has as its object a transmission, in particular between a drive shaft and a wheel driving shaft of an engine, in particular of an automotive engine, such as a riding mower engine, whereby this transmission is of the belt-controlled variable-speed drive unit type combined with at least one progressive clutch device, preferably a friction clutch, characterized in that the transmission, of which the clutch device or each clutch device of progressive type is in disengaged position when there is no stress, comprises a control mechanism that is common to the clutch device(s) and to the variable-speed drive unit, whereby this control mechanism acts, in a first step, on the actuator of the clutch device or one of the clutch devices that is (are) found in disengaged position when there is no stress of the control mechanism to pass from the so-called zero-speed disengaged position to the engaged position that corresponds to the minimum operating speed of the variable-speed drive unit, then acts, in a second step, on the speed variation mechanism of the variable-speed drive unit for regulating as desired the speed of the engine that is equipped with such a variable-speed drive unit.

According to a first embodiment of the invention, the transmission also comprises at least one direction of movement reverser, in particular for advance of the engine controlled by the control mechanism that is common to the clutch device(s) and to the variable-speed drive unit.

In a first variant, the transmission comprises two clutch devices that are selectively controlled by the common control mechanism, whereby these clutch devices act as direction reversers.

In a second variant, the direction reverser is separate from the clutch device or devices.

In this case, the actuator of the clutch device and the speed variation mechanism of the variable speed drive unit are made up of one and the same element, whereby the clutch device is integrated in the variable-speed drive unit.

According to another embodiment of the invention, the transmission comprises at least one braking device, generally friction-based, able to act on the wheel driving shaft, whereby this braking device is controlled by the control mechanism that is common to the braking device(s) and to the variable-speed drive unit.

In a third embodiment of the invention, the transmission comprises, in addition at least to at least one clutch device and a variable-speed drive unit, a direction reverser and a braking device, whereby the direction reverser and the braking device are controlled by the control mechanism that is common to the clutch device(s) and the variable-speed drive unit.

Generally, the control mechanism that is common to at least the clutch device(s), the variable-speed drive unit and optionally a braking device or a direction reverser comprises at least one multifunction linear or rotary cam. The cam comprises a number of action zones and acts, directly or by a movement transmission element, such as a cable, on the actuator of the clutch device or of each clutch device, on the speed variation mechanism of the variable-speed drive unit and optionally on the actuator of the braking device and on the actuator of the reverser, whereby these actuators and the variation mechanism are made up each time of at least one lever. The cam is controlled in movement by at least one hand or foot control element, such as a pedal, or a handle, preferably rotating. The movement control element of the cam is connected to the cam by a flexible or rigid movement transmission element, preferably a cable element.

Thanks to the combination of two systems, namely a progressively-controlled friction clutch returned to disengaged position in the absence of any stress and a belt-controlled variable-speed drive unit whose operations are series-controlled over time, whereby the control mechanism maintains its action on the clutch device in parallel with its action on the variable-speed drive unit, a variation of the rate of advance of the engine within a range of between zero and the maximum speed of the engine is obtained, whereby this variation is carried out continuously and progressively, i.e., without a jerk. Such a combination makes it possible to obtain control sensations that are identical to a hydrostatic system without having, both in terms of cost and in terms of maintenance, the drawbacks of such a system.

The invention also has as its object an engine, preferably an automotive engine, such as a riding mower engine, of the type that comprises, between a drive shaft and a wheel driving shaft of the engine, a belt-controlled variable-speed drive unit-type transmission combined with at least one clutch device, characterized in that the transmission is of the above-mentioned type.

The invention also has as its object a process for operational control of an automotive engine, in particular a riding mower engine, comprising, between a drive shaft and a wheel driving shaft of the engine, a transmission that comprises at least one progressive clutch device, preferably a friction clutch, a reverser of the direction of advance of the engine, a braking device that can act on the wheel driving shaft of the engine, and a belt-controlled variable-speed drive unit, whereby said process comprises at least one operation for control of the braking device, an operation for control of the direction reverser, an operation for control of the clutch device or of one of the clutch devices, and an operation for control of the variable-speed drive unit, whereby some of said operations can be carried out simultaneously, a process that is characterized in that it consists, for the implementation of said control operations, in acting on a control mechanism that is common to the braking device, the direction reverser, the clutch device(s) and the variable-speed drive unit.

The invention will be well understood from reading the following description of embodiments, with reference to the accompanying drawings in which.

BRIEF DESCRIPTION OF DRAWINGS

DETAILED DESCRIPTION

As mentioned above, the transmission 1, object of the invention, is more particularly intended to be installed between a drive shaft, such as the blade-holder shaft of a riding mower automotive engine, and a wheel driving shaft 10 of said engine. This transmission comprises at least one belt-controlled variable-speed drive unit 16 combined with a clutch device 7. In the example shown in the figures, the drive shaft of the engine was omitted. This drive shaft is generally coupled by a first single-pulley endless belt-type transmission indicated by 17 in the figures, whereby this pulley is driven in rotation around a shaft 19. This shaft 19 also comprises a first pulley, called a driving pulley, of the variable-speed drive unit 2. This first pulley is made up of two flanges, one stationary 15 and the other movable 13. This first pulley is connected via a belt 16 to a second pulley, called a driven pulley, made up again of two flanges, one movable 11, and the other stationary 12. This variable-speed drive unit 2 therefore comprises at least two pulleys with at least one of the pulleys with flanges 11, 12; 13, 15 that can move in the direction of a drawing-together or a separation of said flanges. In the examples shown, the two pulleys have movable flanges. The variable-speed drive unit speed variation mechanism 5, 6 of such a variable-speed drive unit controls the drawing-together or the separation of the flanges of one of the pulleys. In this case, in the example shown in FIGS. 1 to 8 and 10, the mechanism 5, 6 of the variable-speed drive unit, which makes it possible to regulate, within a minimum speed-maximum speed range, the speed of the engine that is equipped with such a variable-speed drive unit 2, acts on the driving pulley, namely the one that consists of flanges 13 and 15. Conversely, in FIG. 9, the mechanism 6 of the variable-speed drive unit acts on the driven pulley. In a minimum position of the variable-speed drive unit, the flanges 13, 15 of this driving pulley are separated as much as possible while the flanges 11, 12 of the driven pulley are drawn together as much as possible. When the speed variation mechanism 5, 6 of the variable-speed drive unit acts on the driving pulley, it controls, to increase the speed, the drawing-together of the flanges of this driving pulley, which concomitantly brings about a separation of the flanges of the driven pulley. The more the flanges of the driven pulley are separated from one another, the weaker the winding diameter of the belt on this pulley and consequently the higher the rotation speed of the shaft 18 that carries the pulley. The variable-speed drive unit is therefore in a position that corresponds to a maximum rate of advance of the engine. The shaft 18 that carries the driven pulley constitutes the input shaft of a transmission case 4 that generally houses at least one reduction mechanism and a clutch device. The clutch device, numbered 7 in the figures, is not shown in FIGS. 1 to 8 to reduce the representations. Actually, only the actuator that comprises the fork 7A and the lever 3 combined in the clutch device that allows the passage from an engaged position to a disengaged position of the clutch elements were shown in these figures.

The clutch device or each clutch device 7 of the transmission is a progressive clutch device, preferably a friction clutch. The transmission can comprise one or more clutch devices 7. In the examples described below in FIGS. 1 to 8, the transmission comprises only a single clutch device. FIG. 9 shows a solution of a transmission that comprises two clutch devices 7 carried by a common shaft 18 and one corresponding to the engine operating in forward and the other corresponding to the engine operating in reverse. In this case, the clutch devices act as a reverser of the direction of the engine. Independently of the number of clutches adopted, each clutch can be a cone clutch, a disk clutch or any other progressive-type clutch. The fork 7A that is combined with a lever 3 therefore generally controls the movement of the elements, such as a clutch disk or cone, on a so-called input shaft for making possible the transmission of movement from the input shaft 18 to another shaft. This other shaft constitutes either the wheel driving shaft of the engine directly or is coupled to a wheel driving shaft of the engine, indicated by 10 in the figures.

The description given here constitutes only one example of a transmission that incorporates a variable-speed drive unit 2 with a belt 16 that is combined with a clutch device 7. Quite obviously, other designs can be adopted.

In a manner characteristic of the invention, the transmission that is equipped with at least one progressive clutch device 7, preferably a friction clutch, comprises a control mechanism 20 that is common to the clutch device 7 and to the variable-speed drive unit 2. This control mechanism 20 acts, in a first step, on the clutch device 7, in particular on the actuator that is made up of the lever 3 and the fork 7A of the device to pass from the disengaged position, so-called zero speed, to the engaged position, corresponding to the minimum speed of operation of the variable-speed drive unit 2, then, in a second step, on the speed variation mechanism 5, 6 of the variable-speed drive unit 2 to regulate as desired the speed of the engine that is equipped with such a variable-speed drive unit 2. It should be noted that the control mechanism 20 acts on the speed variation mechanism 5, 6 of the variable-speed drive unit while maintaining its action on the clutch device to keep the latter in engaged position contrary to the prior art where when there is no stress, the clutch device is in engaged position.

In the examples shown in FIGS. 1 to 8, the control mechanism 20, common to the clutch device 7 and to the variable-speed drive unit 2, comprises a multifunction cam 20, whereby this cam 20 comprises at least two action zones that act successively, during an acceleration, one on the clutch device 7, in particular on the actuator of the clutch device 7, and the other on the speed variation mechanism 5, 6 of the variable-speed drive unit 2. This cam 20 therefore exhibits, on the one hand, an outside cam section 20A or a hole 20B that houses a pin that acts on the control 3 of the clutch device 7, and, on the other hand, a hole 22 that houses a control pin 23 coupled to the speed variation mechanism 5, 6 and acts on the latter, by movement of the cam 20 after engagement, when the pin 23 abuts an end wall of the hole 22. This cam 20 can be a rotary or linear cam. This cam 20 is controlled by movement via a hand or foot control element, such as a pedal 29, or a handle, preferably rotating. The movement control element 29 of the cam 20 is connected to the cam by a transmission element 9 of flexible or rigid movement, preferably with a cable. Finally, the cam 20 is generally equipped with an end-of-travel stop that is made up of a pin 24 that moves inside a hole 25, this pin abutting against an end wall of said hole.

Two embodiments of such a control mechanism acting on a transmission that integrates a variable-speed drive unit and a clutch device will hereby be described.

Figure 1:
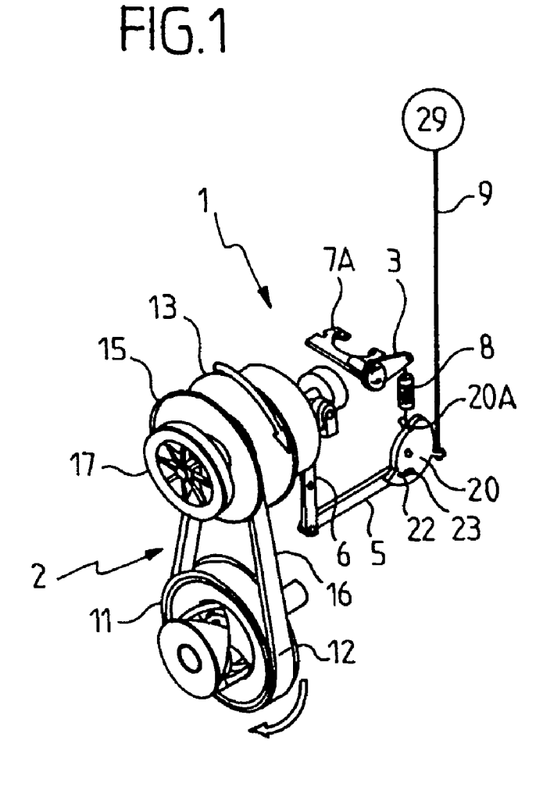
FIG. 1 shows a partial perspective view of a transmission according to the invention.
Figure 2:
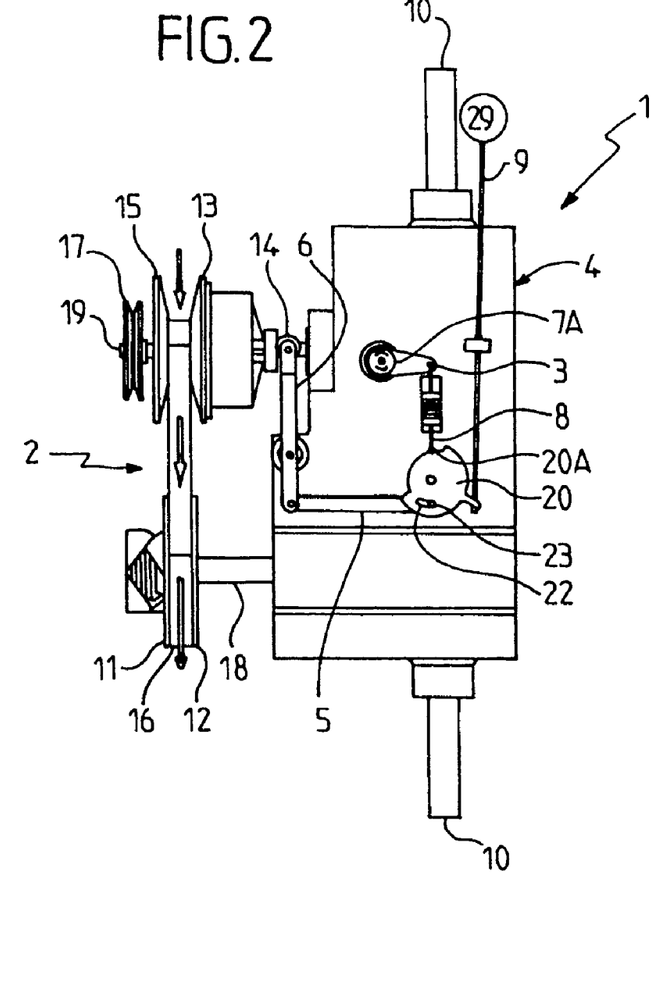
FIG. 2 shows a partial diagrammatic view of a transmission according to the invention in a minimum position of the variable-speed drive unit, whereby the clutch lever is in disengaged position such that the rate of advance of the engine is equal to zero.
Figure 3:
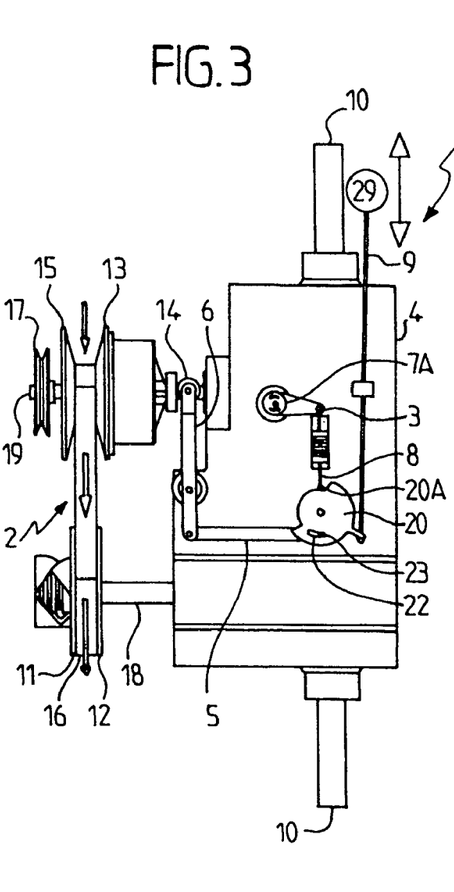
FIGS. 3 to 5 show, in the form of partial diagrammatic views, the different positions of a variable-speed drive unit and a clutch lever, whereby the control of said device is obtained from a rotary cam.
Figure 4:
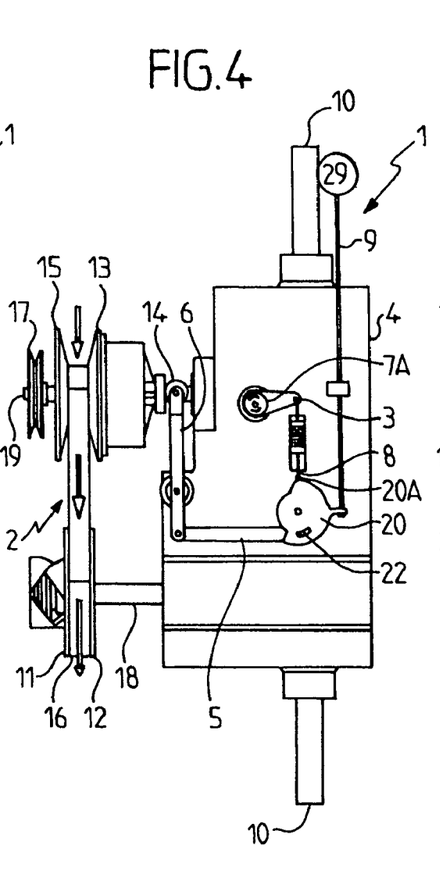
Figure 5:
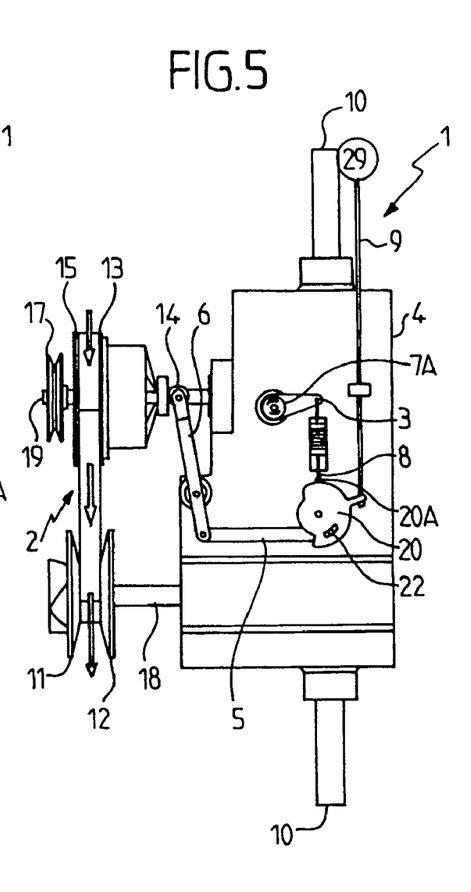

A first embodiment, according to FIGS. 3 to 5, corresponds to an example where the cam 20 is a rotary cam. In this embodiment, the speed variation mechanism 5, 6 of the variable-speed drive unit 2 consists of two levers indicated by 5 and 6 in the figures. A first lever, indicated by 5 in the figures, is equipped with a pin 22 that moves inside a hole 23 of the cam. The other end of this lever is connected by pivoting to a second lever 6, itself terminated by a roller that is designed to rest against the outside face of the movable flange 13 of the driving pulley. The movement of the cam brings about, in particular when the pin 23 abuts an end wall of the hole 22, a movement of said levers, and, consequently, the support of the roller 14 that equips the lever 6 on the movable flange 13 of the driving pulley thus bringing about a drawing-together of said flanges for a variation of speed in the direction of an increase of the rate of advance of the engine. This cam is also equipped with an outside cam section 20A that is designed to act on the control or actuator 3, 7A of the clutch device 7.

As mentioned above, the clutch device has not been shown in its entirety; only the fork 7A of the clutch device 7 has been shown. This fork 7A is moved angularly via a lever 3. This lever 3 is itself driven in angular movement via a rod linkage 8 that is terminated at its end by a roller that is designed to rest on a section 20A of the cam. Thus, during the driving in rotation of the cam 20 in the counterclockwise direction in FIGS. 3 to 5, the roller of the clutch rod linkage 8 provides rolling support along the cam section that causes, because of its shape, a movement of the rod linkage 8 that controls a corresponding angular movement of the lever 3 to make possible, during a first movement of the cam, corresponding to the passage from FIG. 3 to FIG. 4, the passage of the clutch from a disengaged position to an engaged position. During this movement, in parallel, the control pin 23 that is coupled to the speed variation mechanism 5, 6 moves inside the hole 22 until abutting an end wall of the hole 22 as FIG. 4 illustrates. In this position, the continuation of the driving of the cam in rotation brings about a corresponding movement of the levers 5 and 6 that constitute the speed variation mechanism that is designed to act on the variable-speed drive unit in the direction of a drawing-together of the flanges of the driving pulley. This drawing-together produces an increase in the speed transmitted by the shaft 18, and, consequently, an increase of the rate of advance of the engine. As mentioned above, the driving in rotation of the cam is obtained by a movement transmission element 9 that is coupled to a control element, such as a handle or a lever 29. A spring that brings the cam into a position corresponding to the minimum speed of the variable-speed drive unit and a non-engaged position of the clutch device can be provided. When the pin 23 that is coupled to the speed variation mechanism 5, 6 of the variable-speed drive unit abuts an end wall of the hole 22, and the continuation of the movement of the rotary cam brings about a movement of the levers of the speed variation mechanism 5, 6 of the variable-speed drive unit 2, in parallel, the roller of the clutch rod linkage 8 rolls over a circular section of the cam, not generating any movement of the clutch lever 3.

Thanks to such a transmission, a progressive variation of the rate of advance of the engine within a range encompassed between zero and the maximum speed of the engine is therefore obtained.

Figure 6:
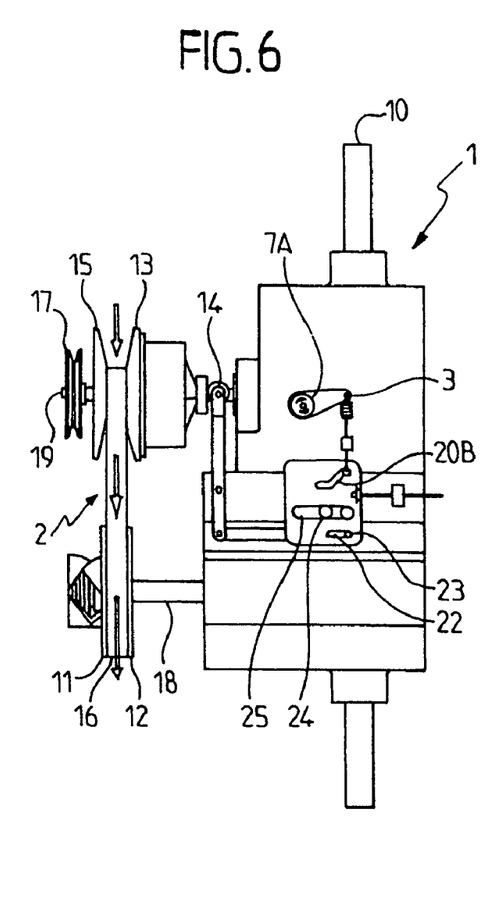
FIGS. 6 to 8 show, in the form of partial diagrammatic views, the different positions that can be occupied by a variable-speed drive unit and a clutch lever, whereby the control element comes in the form of a linear cam.
Figure 7:
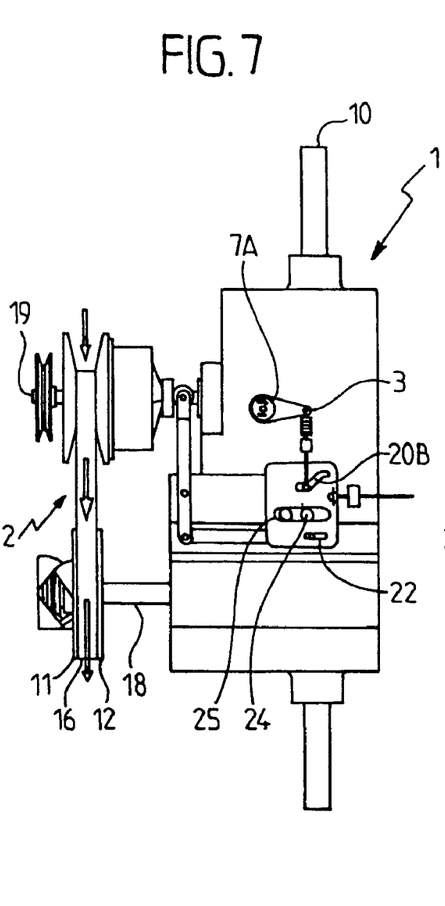
Figure 8:
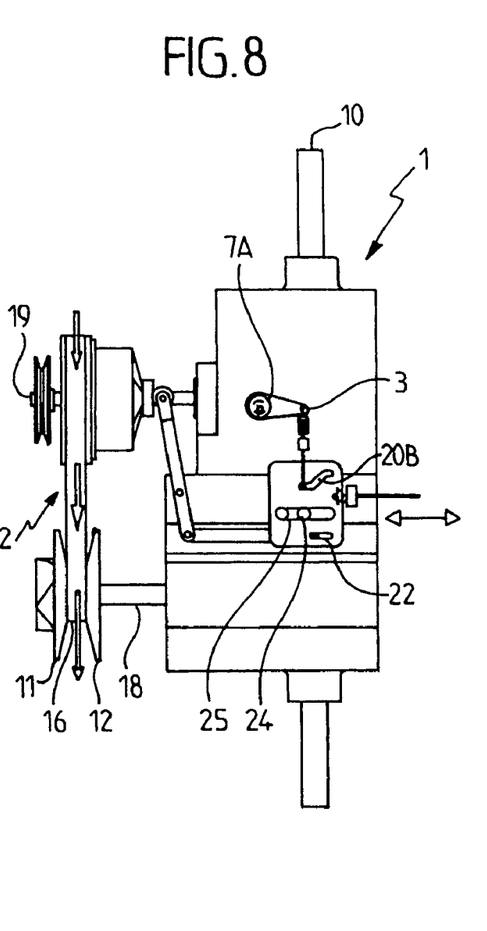
Figure 9:
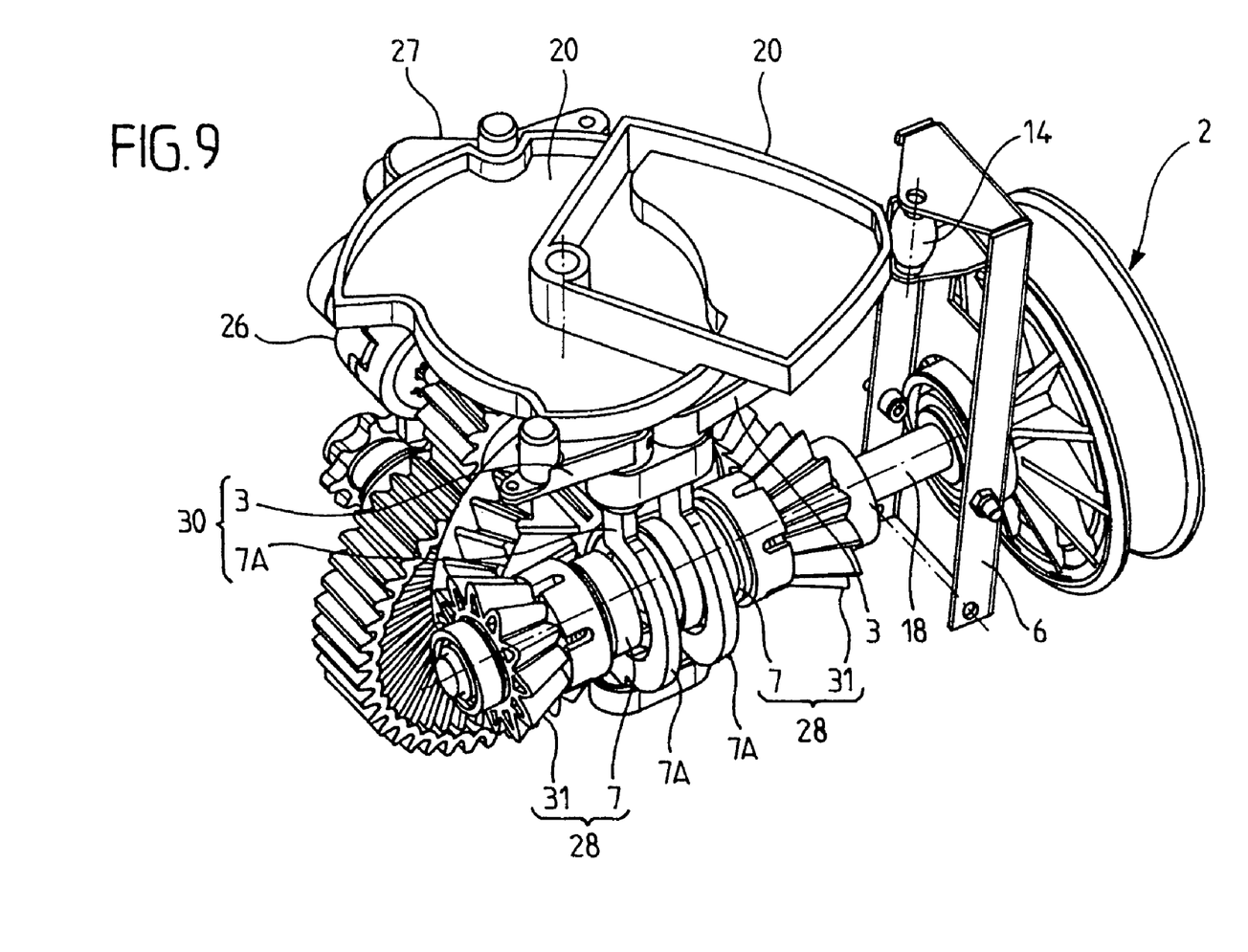
FIG. 9 shows a perspective view of a transmission that is equipped with two clutches.

FIGS. 6 to 8 illustrate anther embodiment of a transmission according to the invention in which the rotary cam was replaced by a linear cam. The operation is similar. Again, FIG. 6 corresponds to an operation of the transmission in which the variable-speed drive unit occupies a position corresponding to the minimum speed position, the clutch lever is in disengaged position, and the transmitted speed is therefore zero.

In FIG. 7, the variable-speed drive unit is still in minimum position while the clutch lever is in engaged position. The speed that is transmitted is therefore the minimum speed that corresponds to the characteristics of the variable-speed drive unit.

FIG. 8 represents the variable-speed drive unit in a maximum speed transmission position, whereby the clutch lever is in engaged position. This position corresponds to a maximum rate of advance of the engine. Again, in this embodiment, the cam is controlled in movement via a movement transmission element 9 that is combined with a control element, such as a handle, a lever 29 or the like.

The clutch device and its control mechanism are analogous to those described for FIGS. 3 to 5. The only difference is that the roller that equips the clutch rod linkage no longer provides rolling support on an outside cam section 20A but moves inside a hole that is indicated by 20B in the figures. This roller would have been able to be replaced by a pin in an equivalent manner. The section of this hole is therefore such that the linear movement of the cam brings about, in a first step, the movement of the lever 3 for bringing this clutch device from a disengaged position to an engaged position.

The speed variation mechanism 5, 6 of the variable-speed drive unit, also identical to the one described for FIGS. 3 to 5, is stressed in movement as soon as the cam has been moved sufficiently to generate the passage from the disengaged position to the engaged position of the lever 3 of the clutch control. During this first movement, the cam 20 makes it possible that a stop that is made up of a pin 23 moves inside a hole 22 of the cam up to a position where the pin abuts against an end wall of said hole 22 such that the continuation of the movement of the cam (FIGS. 7 to 8) creates an action on the levers 5, 6 of the control mechanism of the variable-speed drive unit 2. During this continuation of the linear movement of the cam, the roller of the rod linkage 8 and the pin 23 move in two parallel paths; the movement of the cam is without incident on the clutch lever. To make the speed vary, it is sufficient to move the cam in one direction or the other. The movement of the cam toward the right brings about an increase of the speed of the engine while a movement toward the left brings about a reduction in the speed of the engine.

The cam can also be equipped with an end-of-travel stop that is made up of a pin 24 that moves inside a hole 25 that is provided in said cam, whereby this pin abuts against an end wall of said hole when the cam is moved linearly by a sufficient distance to bring about the passage of the variable-speed drive unit from the minimum speed to the maximum speed.

Again, the cam can be returned by suitable elastic means, such as a spring, into the position that corresponds to the minimum position of the variable-speed drive unit and to the non-engaged position of the clutch device.

Thanks to such a device, the operator obtains a progressive continuous adjustment, without jerking, of the speed variation by acting on a control element that can act both on the variable-speed drive unit 2 and the clutch device 7. Such a transmission therefore makes it possible to be able to vary the speed of the engine continuously from zero to the maximum speed and to be able to preserve between these two end speeds any speed that corresponds to the position of the control element.

In an embodiment of the type according to the one shown in FIG. 9, the clutch device with a single clutch, as described above, is replaced by two clutch devices: one that is used in the forward movement of the engine, the other in the reverse movement of the engine. These two clutch devices can be controlled from a single fork as Patent FR-2,845,746 illustrates in particular, whereby this fork is combined with a lever for reverse operation of the engine. It is also possible to consider a solution in which each clutch device is controlled from a differentiated fork, each clutch corresponding to a direction of advance of the engine. Such is the case shown in FIG. 9.

Independently of its design, such a transmission with at least two clutches can integrate a linear or rotary cam whose movement in a first direction from a neutral position makes it possible to act in a first step on a first clutch device and then on the variable-speed drive unit to vary the rate of advance in forward operation of the engine while a movement of the cam in an opposite direction from the neutral position makes it possible to act in a first step on the second clutch device and then on the variable-speed drive unit to vary the rate of advance when the engine is operating in reverse. This movement in a first and second direction of the cam can be obtained from a pivoting pedal whose movement in a first direction by the foot being planted on said pedal brings about the activation of one of the clutch devices generally corresponding to the engine operating in forward while the movement with pivoting of the pedal in an opposite direction by resting the heel on said pedal brings about the activation of the clutch device generally corresponding to the engine operating in reverse. In this case, the cam can be connected by two sets of levers to the variable-speed drive unit to make possible, after activation of one or the other of the clutch devices, an action of the cam on said variable-speed drive unit so as to vary the rate of advance of the engine between 0 and the maximum speed of the variable-speed drive unit when the engine is operating both in forward and in reverse. The single pedal 29 can, in an equivalent manner, be replaced by two pedals each connected to the cam 20, one that makes up the pedal of forward operation at variable speed of the engine, the other the pedal of reverse operation at variable speed of the engine.

In the examples described above, the transmission comprised only one or more clutch devices 7 combined with a variable-speed drive unit 2. FIG. 9 illustrates the case of a transmission that also comprises a braking device 26 that acts directly or indirectly on the driving in rotation of the wheel driving shaft 10 of the engine. This FIG. 9 also illustrates the case of a transmission that comprises a reverser 28 of the direction of movement of the engine to make possible a movement with the engine operating in forward or in reverse. In this embodiment, the reversal of the operational direction, the brake, the clutches and the variable-speed drive unit are controlled from a common control mechanism. It is sufficient for the operator to act, for example, on a pedal for moving the cam 20 in a direction to bring about, via the cam, in a first step, the releasing of the brake 26 in parallel to the engagement of one or the other of the clutch devices in the direction of advance of the selected engine, then in a second step, the control of the speed variation mechanism 6. The cam 20 is therefore here a polyvalent rotary cam that exhibits on its periphery a number of action zones that each can work with an actuator or the speed variation mechanism.

In this transmission, the shaft 18 of said input shaft, which carries the driven pulley of the variable-speed drive unit as well as the speed variation mechanism 6 of the variable-speed drive unit, also carries two cone clutches indicated by 7 in the figures, whereby these clutches can pass from the disengaged position to the engaged position via a fork 7A and a lever 3 that forms the actuator of each of the clutch devices. In the engaged state, each clutch device brings out the driving in rotation of a conical pinion, indicated by 31 in the figures, and carried by this same shaft 18. It is understood that the passage from the disengaged position to the engaged position of a first clutch device allows the driving in rotation of a first conical pinion 31 that works with a gear wheel that is carried by a shaft that is orthogonal to the shaft 18. This first pinion drives this gear wheel in a first direction of rotation, so-called direction of driving the engine in forward. When, conversely, it is the second clutch device that is brought from the disengaged position to the engaged position, the second conical pinion 31 is driven in rotation and works in the same manner with the same gear wheel to drive in rotation this gear wheel in an opposite direction and to bring about the movement of the engine in an opposite direction or in reverse. The shaft that carries this gear wheel is equipped, furthermore, with a braking device indicated by 26 in the figures, whereby this brake is made up of parts that are likely to be separated or drawn close to one another by means of an actuating lever indicated by 27. Putting the brake into the locked position reduces the speed with which the shaft that carries this brake is driven in rotation until the rotation of said shaft and consequently the transmission of the movement from this shaft to the wheel driving shaft are stopped. A stopping of the engine results. The cam 20 is designed to work with each of the actuators mentioned above. Thus, the cam 20 is equipped with a slot, inside of which is housed the actuator 27 of the brake 26 in its locked position. It is also equipped with sections that allow it, during its driving in rotation, in the direction of driving in rotation, to work with one or the other of control levers 3, 7A of the clutch devices 7. This cam is also able, during its driving in rotation, to work via one of its outside sections with the control lever 6 of the speed variation mechanism of the variable-speed drive unit 2. Thus, the cam 20 is able, during its movement in rotation, to act in parallel or successively to the actuator 27 of the braking device 26 and on one of the actuators of one of the clutch devices then on the speed variation mechanism of the variable-speed drive unit 2. In this particular configuration, the two clutch devices also play the role of reverser of the direction of movement of the engine. Actually, the combination of the clutch device 7 with a conical pinion 31 makes it possible each time to constitute a reverser 28 of the direction of movement of the engine and to select as desired the direction of movement of the engine. The lever 3 and the fork 7A for control of the clutch device thus constitute the equivalent of an actuator 30 of a direction reverser. There therefore results a simplification of the design when the direction reverser and the clutch are controlled simultaneously in parallel with the control of the releasing of the brake, whereby all of these controls are then followed by a control of the speed variation, the unit operating via the same element that is made up of the rotary cam 20.

Figure 10:
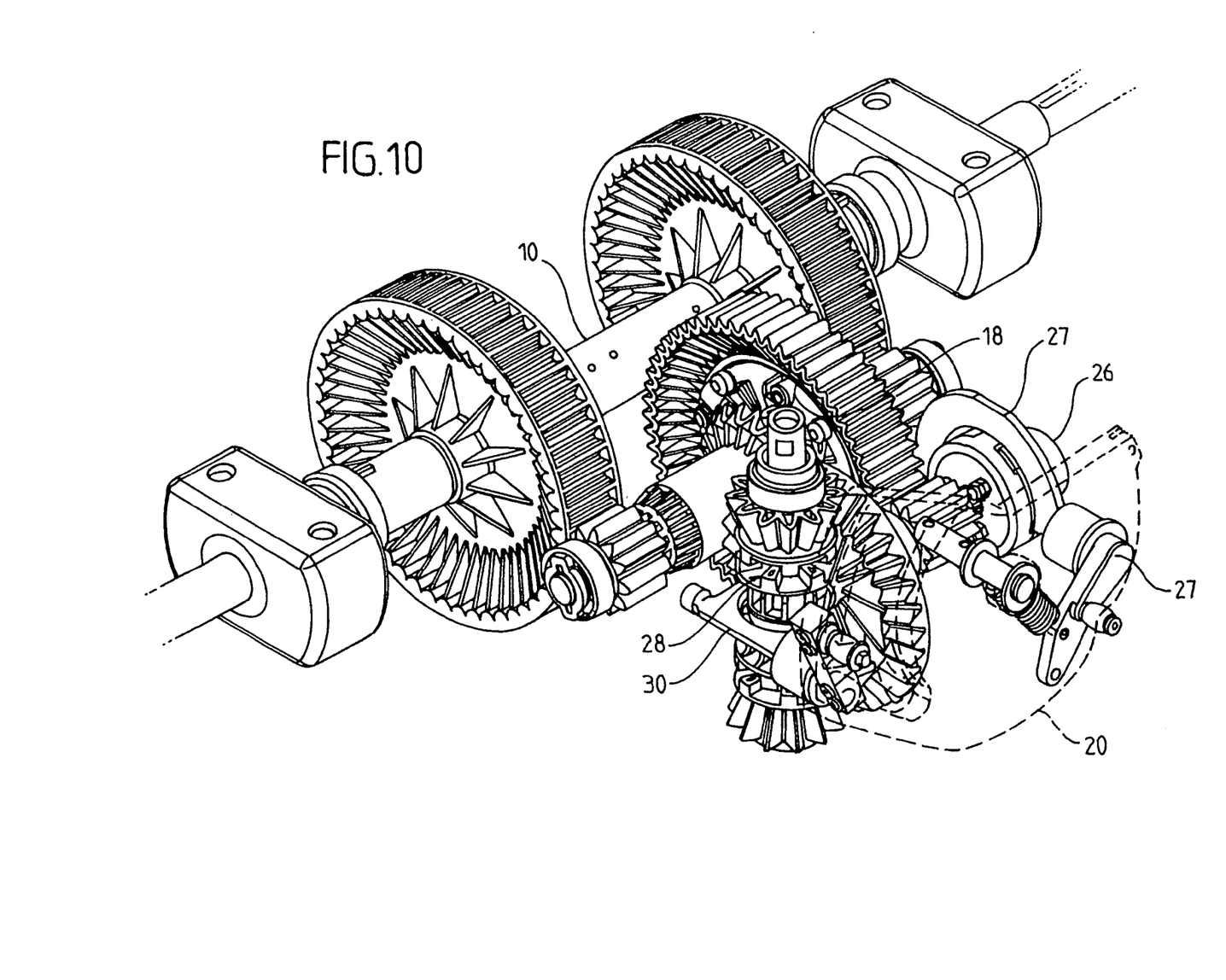
FIG. 10 shows a perspective view of another transmission according to the invention in which the clutch device is integrated into the variable-speed drive unit.

In the example shown in FIG. 10, the shaft 18, so-called input shaft of the transmission, which again carries the driven pulley of the variable-speed drive unit, also comprises a jaw clutching device that plays the role of reverser 28 of the direction of advance of the engine. Actually, a part that can move axially on said shaft is able to engage with one or the other of the conical gear wheels that are carried by said shaft, whereby these conical gear wheels again work with a gear wheel that is carried by a shaft that is orthogonal to said shaft 18. The movement of the input shaft 18 is thus transmitted to a first shaft that carries the braking device 26 and the actuator 27 of this braking device, whereby this first shaft transmits, via a gear train, its movement to a second parallel shaft that carries a differential, this second parallel shaft itself transmitting its movement, again by a gear train system, to half-shafts that make up the wheel driving shaft 10 of the engine. Thus used in this transmission are an input shaft 18 of the transmission and three shafts that are parallel to one another and to which the movement of the input shaft 18 is transmitted successively. Again, one and the same cam 20 is able to control, on the one hand, the actuation of the direction reverser 28, and, on the other hand, the releasing or, respectively, the locking of the braking device 26 in addition to the control of the variable-speed drive unit and the clutch device.

Figure 11:
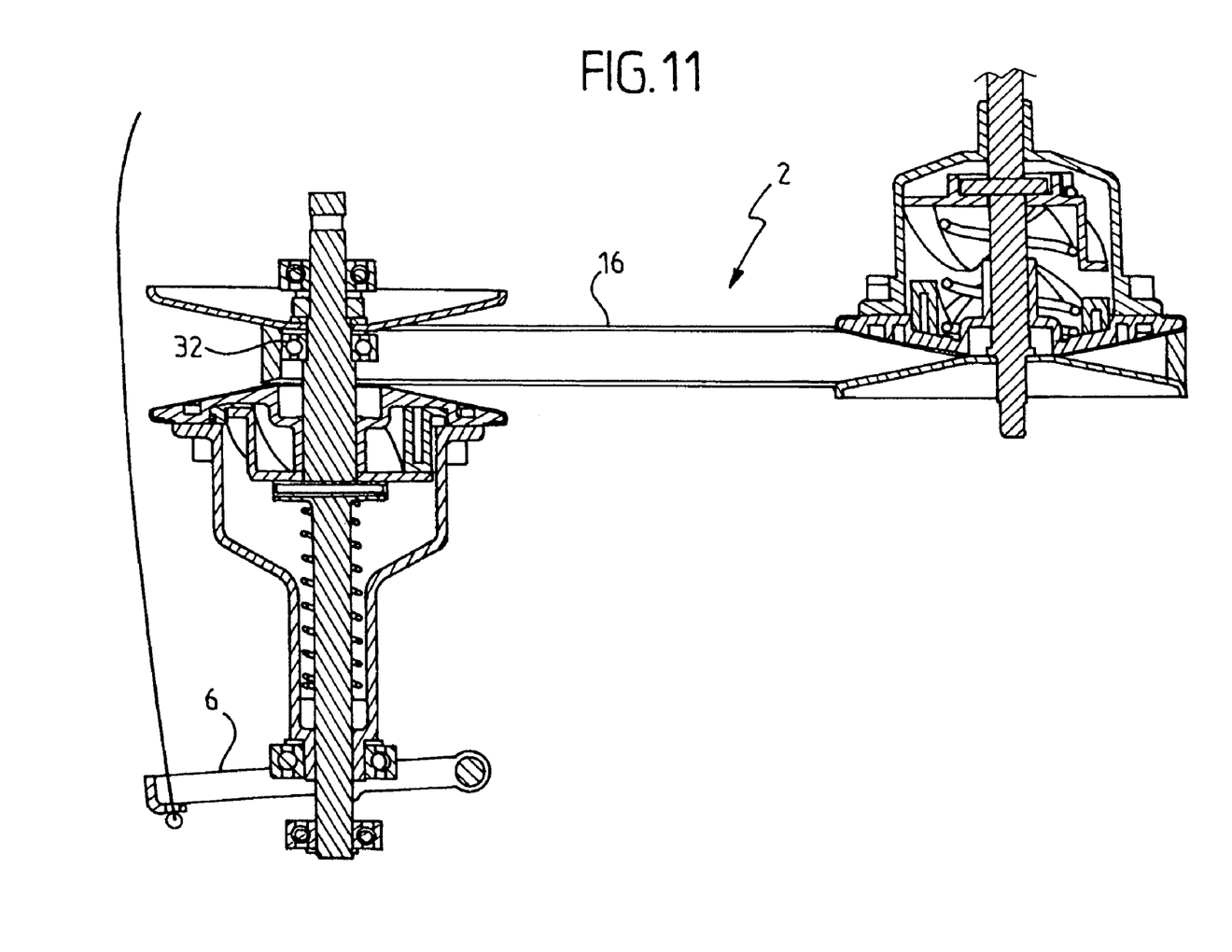
FIG. 11 shows a cutaway view of the variable-speed drive unit integrating the clutch device.

In this particular embodiment, and as FIG. 11 illustrates, the clutch device is integrated in the variable-speed drive unit here. In this case, the variable-speed drive unit is in accordance with what was mentioned above and comprises, in particular at one of its pulleys, two flanges that can be drawn together or separated from one another. The shaft that carries the movable flanges of the pulley also comprises a loose roller 32 that is housed between said flanges. When the transmission is in disengaged position, the belt 16 rubs on the loose roller 32, thus preventing any transmission of movement from one of the pulley-support shafts to the other pulley-support shaft. The drawing-together of the flanges of said pulley until they are brought into contact with the belt 18 makes it possible to transmit the movement from the pulley-support shaft to said belt and consequently to transmit this movement to another pulley-support shaft. Thus, in this case, the clutch device is simply constituted by a loose roller 32 that is housed between two movable flanges of a pulley of the variable-speed drive unit 2 and is controlled via an actuator, not shown in FIG. 11, identical to the speed variation mechanism 6 of FIG. 9. Thus, the speed variation lever 6 simultaneously makes up a clutch lever. The movement of this lever therefore controls, in a first step, the passage from a disengaged position to the engaged position of the clutch device and then, in a second step, the speed variation. Again, it is noted, in this embodiment, that each of the actuators, namely the actuator 27 of the brake 26, the actuator 30 of the direction reverser 28, and the actuator or speed variation mechanism 6 of the variable-speed drive unit 2 are each time made up of levers that can be moved angularly under the action of one and the same control element made up of a rotary cam 20.

It is noted that, in the examples mentioned above, the control mechanism that is common at least to the variable-speed drive unit and to the clutch device is made up of a linear or rotary cam. However, equivalent solutions, in particular lever-based, could also have been considered without exceeding the scope of the invention from the time when such a lever can act both successively and in parallel on at least the clutch and the variable-speed drive unit of a transmission, this lever maintaining its action on the clutch in parallel to its action on the variable-speed drive unit so as to remain engaged during the speed variation.

It should be noted that a control mechanism that is common in particular to the clutch device and to the variable-speed drive unit is defined as a control mechanism whose actuation by the operator generates an action both on the variable-speed drive unit and on the clutch device, and that these actions are simultaneous or successive over time.

In the same manner, a control mechanism that is common to the variable-speed drive unit, to the direction reverser, to the braking device and to the clutch device is defined as a control mechanism that can act on these four elements during its driving in movement controlled by the operator. Such a control mechanism, once actuated by the operator, is therefore able to act simultaneously or successively on the braking device, the direction reverser, the clutch device or devices or the variable-speed drive unit. This control mechanism can be controlled from a single control element or from several control elements that are selectively activated by the operator.

The invention claimed is:

1. A transmission for location between a drive shaft and a wheel driving shaft of an engine, comprising:
    a belt-controlled variable-speed drive unit with a speed variation mechanism;
    at least one progressive clutch device with an actuator, the at least one progressive-type clutch device being in a disengaged position in the absence of any stress; and
    a control mechanism common to clutch device and to the variable-speed drive unit, wherein control mechanism
    i) in a first step, acts on the actuator of the at least one clutch device that is in the disengaged position in the absence of any stress of the control mechanism to pass from the disengaged position of zero speed to an engaged position corresponding to a minimum speed of operation of the variable-speed drive unit, and
    ii) in a second step subsequent to the first step, acts on the speed variation mechanism of the variable-speed drive unit to regulate a desired speed of an engine equipped with such the variable-speed drive unit; and
    at least one reverser of the direction of movement of the engine controlled by the control mechanism common to the at least one clutch device and to the variable-speed drive unit.

2. A transmission according to claim 1, comprising two of said at least one devices, said two clutch devices controlled selectively by the common control mechanism, said clutch devices acting as the direction reverser.

3. A transmission according to claim 1, wherein the direction reverser further comprises a conical pinion operative with the at least one clutch device.

4. A transmission according to claim 1, wherein the actuator of the at least one clutch device and the speed variation mechanism of the variable-speed drive unit are made up of one and the same element, whereby the at least one clutch device is integrated into the variable-speed drive unit.

5. A transmission according to claim 1, wherein the variable-speed drive unit comprises at least two pulleys with at least one pulley having flanges that can move in the direction of a drawing-together or a separation of said flanges, whereby the speed variation mechanism of the variable-speed drive unit controls the drawing-together or the separation of the flanges from one of the pulleys.

6. A transmission according to claim 1, wherein said at least one clutch device comprises at least one cone clutch.

7. An engine in combination with the transmission of claim 1, wherein the transmission is located between a drive shaft and a wheel driving shaft of the engine.

8. A transmission for location between a drive shaft and a wheel driving shaft of an engine, comprising:
    a belt-controlled variable-speed drive unit with a speed variation mechanism;
    at least one progressive clutch device with an actuator, the at least one progressive-type clutch device being in a disengaged position in the absence of any stress; and
    a control mechanism common to clutch device and to the variable-speed drive unit, wherein control mechanism
    i) in a first step, acts on the actuator of the at least one clutch device that is in the disengaged position in the absence of any stress of the control mechanism to pass from the disengaged position of zero speed to an engaged position corresponding to a minimum speed of operation of the variable-speed drive unit, and
    ii) in a second step subsequent to the first step, acts on the speed variation mechanism of the variable-speed drive unit to regulate a desired speed of an engine equipped with such the variable-speed drive unit; and
    at least one generally friction-based braking device, able to act on the wheel driving shaft, said braking device being controlled by the control mechanism that is common to the at least one clutch device and to the variable-speed drive unit.

9. A transmission for location between a drive shaft and a wheel driving shaft of an engine, comprising:
    a belt-controlled variable-speed drive unit with a speed variation mechanism;
    at least one progressive clutch device with an actuator, the at least one progressive-type clutch device being in a disengaged position in the absence of any stress; and
    a control mechanism common to clutch device and to the variable-speed drive unit, wherein control mechanism
    i) in a first step, acts on the actuator of the at least one clutch device that is in the disengaged position in the absence of any stress of the control mechanism to pass from the disengaged position of zero speed to an engaged position corresponding to a minimum speed of operation of the variable-speed drive unit, and
    ii) in a second step subsequent to the first step, acts on the speed variation mechanism of the variable-speed drive unit to regulate a desired speed of an engine equipped with such the variable-speed drive unit;
    a reverser of the direction of movement of the engine; and
    a braking device,
    whereby the reverser of direction and the braking device are controlled by the control mechanism that is common to the at least one clutch device and the variable-speed drive unit.

10. A transmission according to claim 9, wherein the control mechanism that is common at least to the at least one clutch device and the variable-speed drive unit and to the braking device comprises at least one multifunction linear or a rotary cam.

11. A transmission according to claim 10, wherein the rotary cam of the control mechanism comprises a number of action zones and acts directly, or via a movement transmission element on the actuator of the at least one clutch device, the speed variation mechanism of the variable-speed drive unit and on the actuator of the braking device.

12. A transmission according to claim 10, wherein the rotary cam is controlled in movement by at least one hand or foot control element.

13. A transmission according to claim 12, wherein the movement control element of the cam is connected to the cam via a transmission element with flexible or rigid movement.

14. A process for operational control of an engine with a transmission located between a drive shaft and a wheel driving shaft of the engine, the transmission including at least one progressive-type clutch device, a reverser of the direction of advance of the engine, a braking device that can act on the wheel driving shaft of the engine, and a belt-controlled variable-speed drive unit, said process comprising:

at least one control operation of the braking device,
an operation for control of the direction reverser,
an operation for control of the at least one clutch device, and
an operation for control of the variable-speed drive unit,
whereby some of said operations can be carried out simultaneously, and
wherein, for implementation of said control operations, said process acts on a control mechanism that is common to the braking device, the at least one clutch device, and the variable-speed drive unit.

15. The process of claim 14, wherein the engine is a riding mower engine.

16. The transmission of claim 1, wherein said at least one reverser comprises at least one jaw clutching device.

17. The transmission of claim 9, wherein said reverser comprises at least one jaw clutching device.

18. The process of claim 14, wherein the reverser comprises at least one jaw clutching device.

* * * * *

UNITED STATES PATENT AND TRADEMARK OFFICE
CERTIFICATE OF CORRECTION

PATENT NO. : 7,641,580 B2 Page 1 of 1
APPLICATION NO. : 11/583153
DATED : January 5, 2010
INVENTOR(S) : Robert Blanchard It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this

Twenty-first Day of December, 2010

David J. Kappos
*Director of the United States Patent and Trademark Office*